US006817090B1

(12) United States Patent
McAdoo et al.

(10) Patent No.: US 6,817,090 B1
(45) Date of Patent: Nov. 16, 2004

(54) TRUSS FABRICATION METHOD AND APPARATUS

(76) Inventors: David L. McAdoo, 3636 County Rd. 613, Alvarado, TX (US) 76009; Michael C. Rosser, 2051 Meadowview Rd., Roanoke, TX (US) 76262-9065

( * ) Notice: Subject to any disclaimer, the term of this patent is extended or adjusted under 35 U.S.C. 154(b) by 0 days.

(21) Appl. No.: 09/416,862

(22) Filed: Oct. 13, 1999

Related U.S. Application Data

(60) Provisional application No. 60/104,035, filed on Oct. 13, 1998.

(51) Int. Cl.[7] .................................................. B23P 21/00

(52) U.S. Cl. ....................... 29/772; 227/152; 29/897.31

(58) Field of Search ................................ 29/281.5, 772, 29/798, 432, 281.3, 429, 464, 467, 468, 716, 430, 432.2, 897.31; 227/152

(56) References Cited

U.S. PATENT DOCUMENTS

| | | | |
|---|---|---|---|
| 1,057,799 A | 4/1913 | Holder | |
| 2,548,114 A | 4/1951 | MacLeod | |
| 3,100,301 A | 8/1963 | Black | |
| 3,244,091 A | * 4/1966 | Anderson et al. | |
| 3,255,943 A | * 6/1966 | Sanford | |
| 3,277,939 A | * 10/1966 | Scott | |
| 3,375,778 A | 4/1968 | Newman | 100/215 |
| 3,413,703 A | * 12/1968 | Sanford | |
| 3,583,588 A | 6/1971 | Royal, Sr. | 214/713 |

(List continued on next page.)

FOREIGN PATENT DOCUMENTS

| | | |
|---|---|---|
| EP | 0 909 617 A2 | 4/1999 |
| FR | 2773097 | * 12/1997 |

OTHER PUBLICATIONS

"The Floor Trussmaker" advertisement, copyright Apr., 1997 by TEE–LOK Corporation—2 pages.
"TEE–FLOOR" advertisement, copyright Aug., 1997 by TEE–LOK Corporation—2 pages.
"The Fat Man Floor Truss Assembly System" advertisement, Jan. 20, 1981 by production equipment & engineering co. —7 pages.

*Primary Examiner*—Douglas Olms
*Assistant Examiner*—Steve Blount
(74) *Attorney, Agent, or Firm*—Peter V. Schroeder; Crutsinger & Booth, LLC

(57) ABSTRACT

A truss assembly apparatus and a method for assembling a truss utilizing the apparatus, the apparatus comprising a truss table having a work surface divided into a first and second assembly zone. The apparatus further includes first and second clamping assemblies for clamping the truss in the first and second assembly zones. The apparatus includes a flip-over assembly having a flip-over arm movable relative to the truss table for moving the truss from a first truss position in the first assembly zone, wherein a first truss face contacts the work surface, to a second truss position in the second assembly zone, wherein a second truss face contacts the work surface.

The flip-over arm is movable between a home position adjacent said work surface and an extended position, wherein the flip-over arm may be perpendicular to the work surface. In another alternative, at least a portion of the flip-over arm may extend over the second assembly zone when the flip-over arm is in the extended position. The flip-over assembly may comprise a plurality of movable flip-over arms for moving the truss from the first truss position to the second truss position. The invention preferably includes a lift-out assembly having at least one lift-out arm movable relative to the truss table for moving the truss from the second truss position in the second assembly zone to a finished position spaced from the work surface. The finished position may be above and preferably extends beyond the work surface. The lift-out arm may comprise a plurality of lift-out arm rollers mounted thereon.

40 Claims, 7 Drawing Sheets

U.S. PATENT DOCUMENTS

| | | | | | |
|---|---|---|---|---|---|
| 3,709,762 | A | | 1/1973 | Chandler | 156/580 |
| 3,751,794 | A | | 8/1973 | Kay | |
| 3,866,530 | A | * | 2/1975 | Moehlenpah | |
| 3,896,717 | A | * | 7/1975 | Schmitt | |
| 3,945,630 | A | | 3/1976 | Brunemann | |
| 3,990,691 | A | | 11/1976 | Wolf | |
| 4,024,809 | A | | 5/1977 | Moehlenpah | |
| 4,044,093 | A | | 8/1977 | Jureit | |
| 4,063,498 | A | * | 12/1977 | Labellarte | |
| 4,084,498 | A | | 4/1978 | Weaver | |
| 4,084,499 | A | | 4/1978 | Moehlenpah | |
| 4,089,107 | A | | 5/1978 | Sanford | |
| 4,148,471 | A | | 4/1979 | Werner | |
| 4,252,058 | A | | 2/1981 | Tison | 100/173 |
| 4,295,269 | A | | 10/1981 | Wright | 29/798 |
| 4,305,538 | A | | 12/1981 | Schultz et al. | |
| 4,339,117 | A | | 7/1982 | Tison | |
| 4,383,680 | A | | 5/1983 | Braceland | |
| 4,394,952 | A | | 7/1983 | Crane | |
| 4,623,083 | A | | 11/1986 | Pagano | |
| 4,627,564 | A | * | 12/1986 | Bowser | |
| 4,645,113 | A | | 2/1987 | Webber | |
| 4,660,815 | A | | 4/1987 | Rosser | 269/22 |
| 4,824,004 | A | * | 4/1989 | Hanson | |
| 4,829,651 | A | * | 5/1989 | Shirai | 29/432 X |
| 4,846,923 | A | | 7/1989 | Lines | |
| 4,998,336 | A | * | 3/1991 | Papsdorf | |
| 5,170,558 | A | | 12/1992 | Hubbard | 29/897.31 |
| 5,350,162 | A | * | 9/1994 | Cushing | |
| 5,379,513 | A | | 1/1995 | Thompson et al. | |
| 5,600,882 | A | | 2/1997 | Beane | |
| 5,617,622 | A | | 4/1997 | Anderson | |
| 5,676,358 | A | | 10/1997 | Shamblin et al. | |
| 5,725,205 | A | * | 3/1998 | O'Berg | |
| 5,768,769 | A | | 6/1998 | Shamblin | |
| 5,772,192 | A | | 6/1998 | Hoffmann | |
| 5,933,957 | A | | 8/1999 | Haase | 29/897.31 |
| 5,947,460 | A | | 9/1999 | Williams | |
| 6,079,325 | A | * | 6/2000 | LePoire et al. | |
| 6,260,263 | B1 | * | 7/2001 | Haase | |
| 6,560,858 | B1 | * | 5/2003 | McAdoo | |

* cited by examiner

TRUSS FABRICATION METHOD AND APPARATUS

CROSS-REFERENCE TO RELATED APPLICATIONS

This application claims the benefit of the filing date of co-pending Provisional Application Ser. No. 60/104,035, filed Oct. 13, 1998 by David L. McAdoo and Michael C. Rosser entitled "TRUSS FABRICATION METHOD AND APPARATUS," the disclosure of which is incorporated herein by reference in its entirety for all purposes.

TECHNICAL FIELD

The present invention relates in general to an apparatus and method for fabricating structural components. More particularly, this invention concerns an apparatus and method for assembling pre-cut members into trusses and joists.

BACKGROUND OF INVENTION

Prefabricated building components, now widely utilized in the construction industry, are typically assembled at a manufacturing facility and then transported to the job site for incorporation into a building structure. Prefabricated trusses for,use as roof or floor supports are assembled from pre-cut wooden chord and web members positioned in abutting relationship and connected together using toothed fastener plates.

Truss assembly devices have been developed for performing this task semi-automatically. The pre-cut wooden members are positioned manually over a support surface and clamped in place, after which connector plates are laid over the abutting joints. The connector plates are then embedded into the members with a gantry or other press to secure the joints on one side. The semi-complete truss is then turned over and similarly secured at the joints on the opposite side.

Various arrangements or truss tables in gantry presses have been employed in the truss assembly devices of the prior art. The prior truss assembly devices, however, have several shortcomings. The clamping methods utilized by the prior machines have been found inadequate in terms of adjustability, positive actuation and the like. In addition, the prior machines have been relatively slow in operation because movement of the trusses on the table during fabrication has been done primarily manually.

There exists a need for a new and improved truss assembly apparatus.

SUMMARY OF THE INVENTION

The invention is for a truss assembly apparatus and a method for assembling a truss utilizing the apparatus. The apparatus comprises a truss table having a work surface divided into a first and second assembly zone. The apparatus further includes first and second clamping assemblies for clamping the truss in the first and second assembly zones. The apparatus includes a flip-over assembly having a flip-over arm movable relative to the truss table for moving the truss from a first truss position in the first assembly zone, wherein a first truss face contacts the work surface, to a second truss position in the second assembly zone, wherein a second truss face contacts the work surface.

The flip-over arm is movable between a home position adjacent said work surface and an extended position, wherein the flip-over arm may be perpendicular to the work surface. In another alternative, at least a portion of the flip-over arm may extend over the second assembly zone when the flip-over arm is in the extended position. The flip-over assembly may comprise a plurality of movable flip-over arms for moving the truss from the first truss position to the second truss position.

The invention preferably includes a lift-out assembly having at least one lift-out arm movable relative to the truss table for moving the truss from the second truss position in the second assembly zone to a finished position spaced from the work surface. The finished position may be above and preferably extends beyond the work surface. The lift-out arm may comprise a plurality of lift-out arm rollers mounted thereon.

The work surface preferably has a plurality of assembly slots therein. The plurality of flip-over arms are aligned with the plurality of assembly slots to allow movement of the flip-over arms from home positions to extended positions. Similarly, the plurality of lift-out arms are aligned with the plurality of assembly slots to allow movement of the lift-out arms.

Flip-over actuators corresponding to the flip-over arms are positioned below the work surface and are interconnected between the truss table and the flip-over arms and are operable to move the flip-over arms. Similarly, the apparatus may include lift-out actuators.

Preferably, the first clamping assembly has a plurality of longitudinally spaced first moveable rails, spaces between the plurality of first moveable rails being aligned with the assembly slots. Similarly, the second clamping assembly preferably has a plurality of longitudinally spaced second moveable rails, spaces between the plurality of second moveable rails being aligned with the assembly slots. The first movable rails are each movable between a first rail home position, wherein the truss is free to move, and a first rail clamped position, wherein the first movable rails contact the truss when the truss is in the first truss position, and wherein the second movable rails are each movable between a second rail home position, wherein the truss is free to move, and a second rail clamped position, wherein the second movable rails contact the truss when the truss is in the second truss position. The first movable rails and the second movable rails are preferably adjacent when the first and second movable rails are in the first and second rail home positions.

BRIEF DESCRIPTION OF THE DRAWINGS

Drawings of a preferred embodiment of the invention are annexed hereto, so that the invention may be better and more fully understood, in which.

Figure 1:
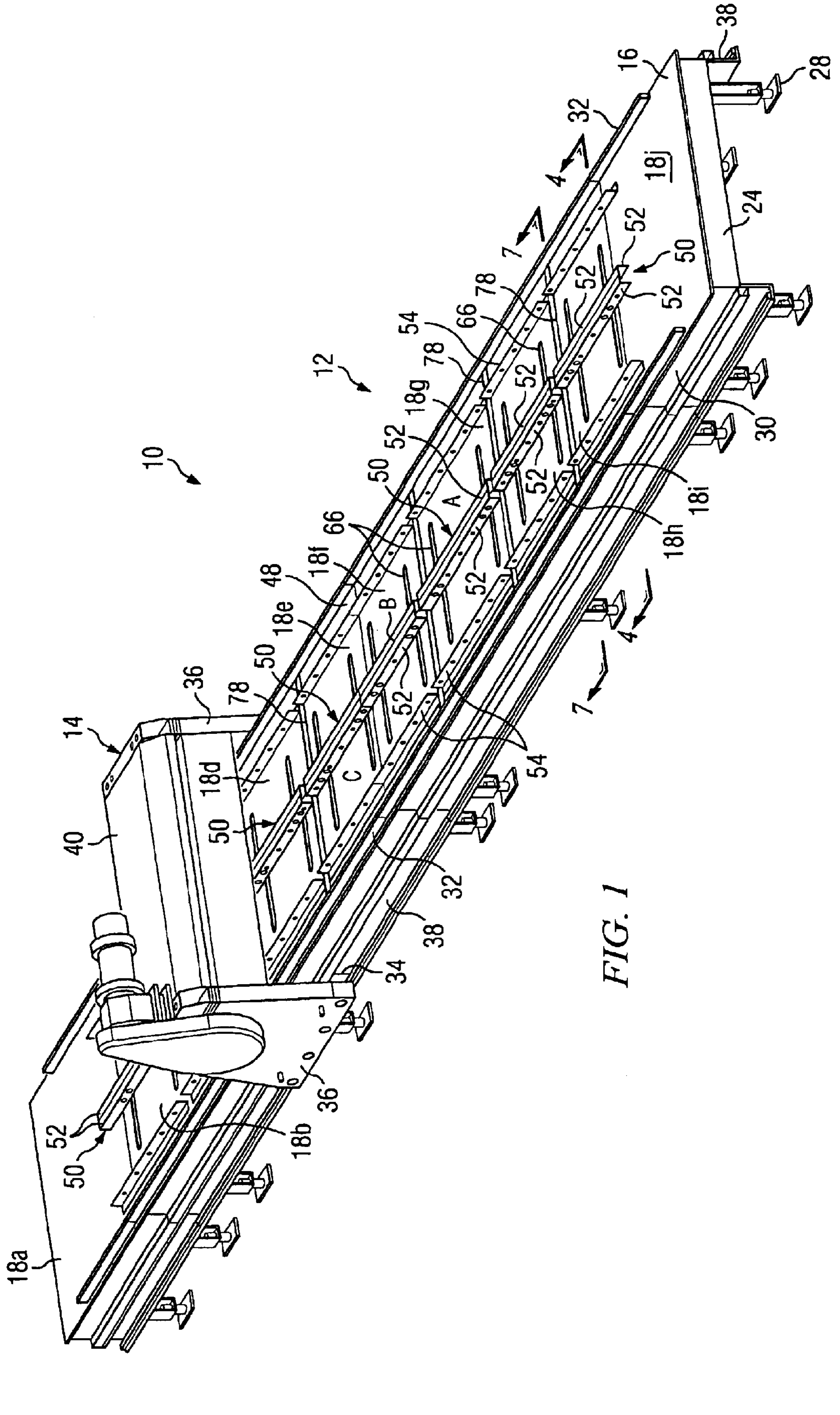
FIG. 1 is a perspective view of a truss assembly apparatus.

Numeral references are employed to designate like parts throughout the various figures of the drawing. Terms such as "left," "right," "clockwise," "counter-clockwise," "horizontal," "vertical," "up" and "down" when used in reference to the drawings, generally refer to orientation of the parts in the illustrated embodiment and not necessarily during use. The terms used herein are meant only to refer to relative positions and/or orientations, for convenience, and are not to be understood to be in any manner otherwise limiting. Further, dimensions specified herein are intended to provide examples and should not be considered limiting.

DESCRIPTION OF A PREFERRED EMBODIMENT

Figure 2:
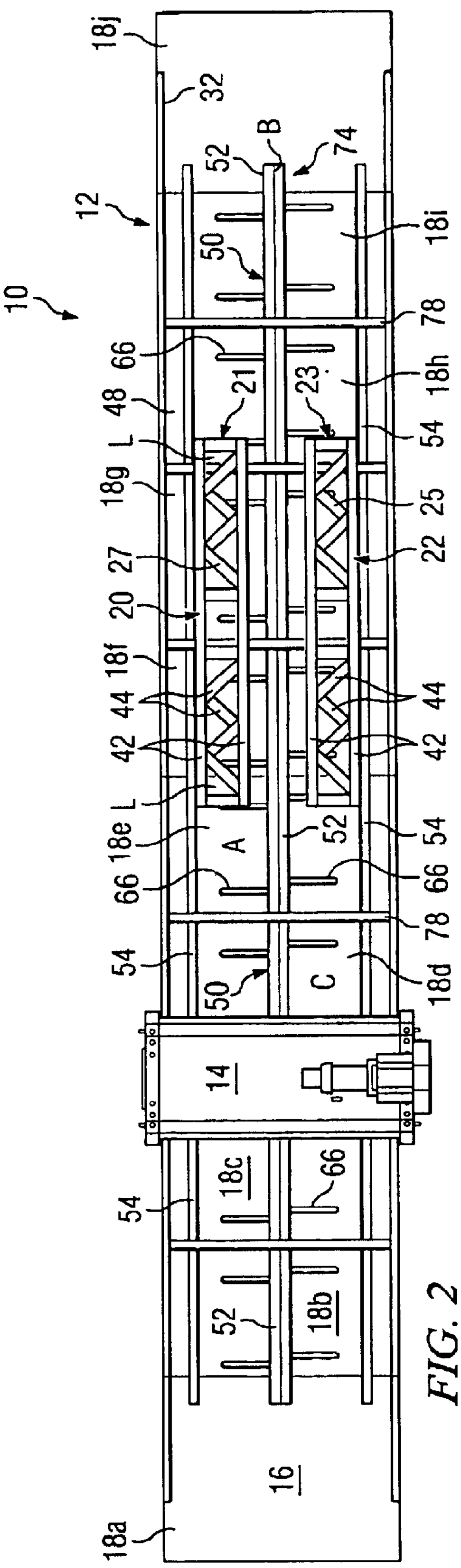
FIG. 2 is a top plan view of a truss assembly apparatus.

The invention is herein described with reference to the accompanying drawings and is not intended to limit the scope of the claimed invention, but is intended to describe particular embodiments to disclose the best mode of the invention to those skilled in the art. FIGS. 1 and 2 show a truss assembly apparatus 10 for semi-automatic manufacture of prefabricated structural components, particularly wooden trusses and joists. The truss assembly apparatus 10 comprises a truss table and a table 12 gantry press 14 supported on the table for movement there along.

The work surface 16 of the truss table 12 is defined by table plates 18 a–j, which are arranged end-to-end. Table plates 18 *b–I* provide working space for assembly of the trusses 20 and 22, while plates 18 *a* and 18 *j* provide staging areas for the table gantry press 14. The table may be designed to any desired length. The plates 18 are supported by a plurality of cross-members 24 which are mounted to the legs 26 of the table. Each leg 26 of the table 12 preferably includes a foot 28 threadedly attached thereto for height adjustment and leveling of the truss table 12 (best seen in FIG. 4). Side beams 30 extend longitudinally beneath the table plates 18. Outer rails 32 extend longitudinally above the table work surface 16 along the outer edges of the table plates 18. Clamping assemblies 50 are attached to the table 12, as shown.

The table gantry press 14 straddles the work surface 16 of the truss table 12 and is supported to run along the length of the table. Gantry wheels 34, located in the gantry arms 36, roll along the gantry tracks 38, which are mounted to the truss table 12. A roller press (not shown) located in the gantry body 40 presses downwardly on the truss table 12 as the gantry press 14 passes along the table length.

Figure 3:
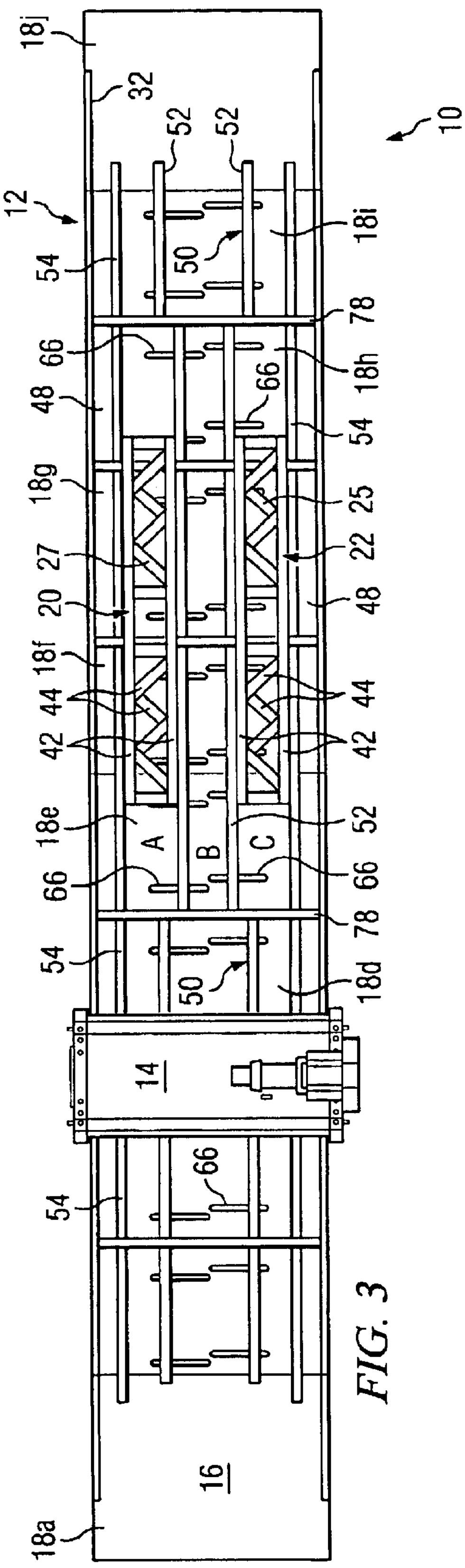
FIG. 3 is a top plan view of a truss assembly apparatus with clamping assemblies actuated.
Figure 4:
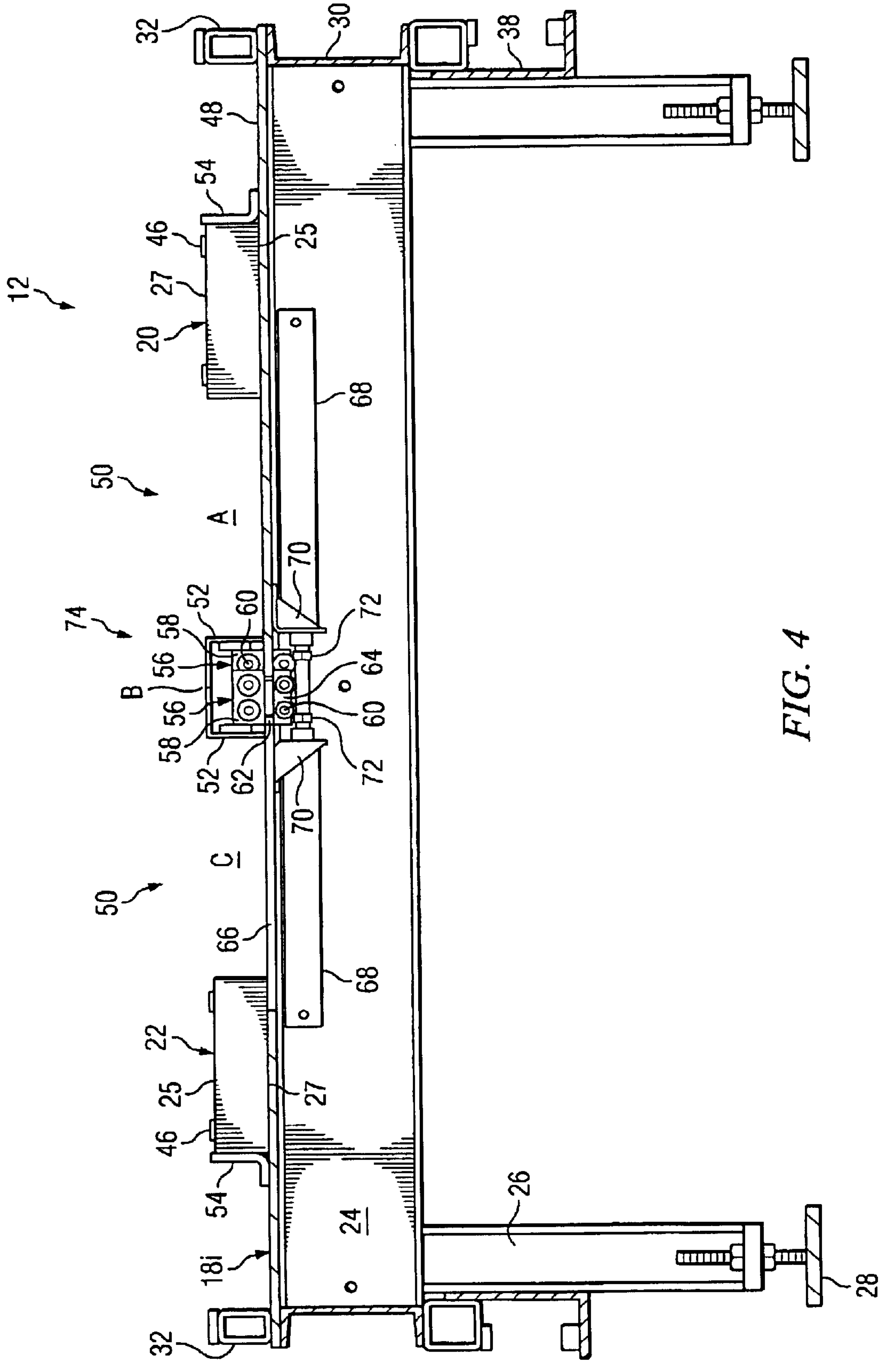
FIG. 4 is an elevational sectional view of a truss table with clamping assemblies.
Figure 5:
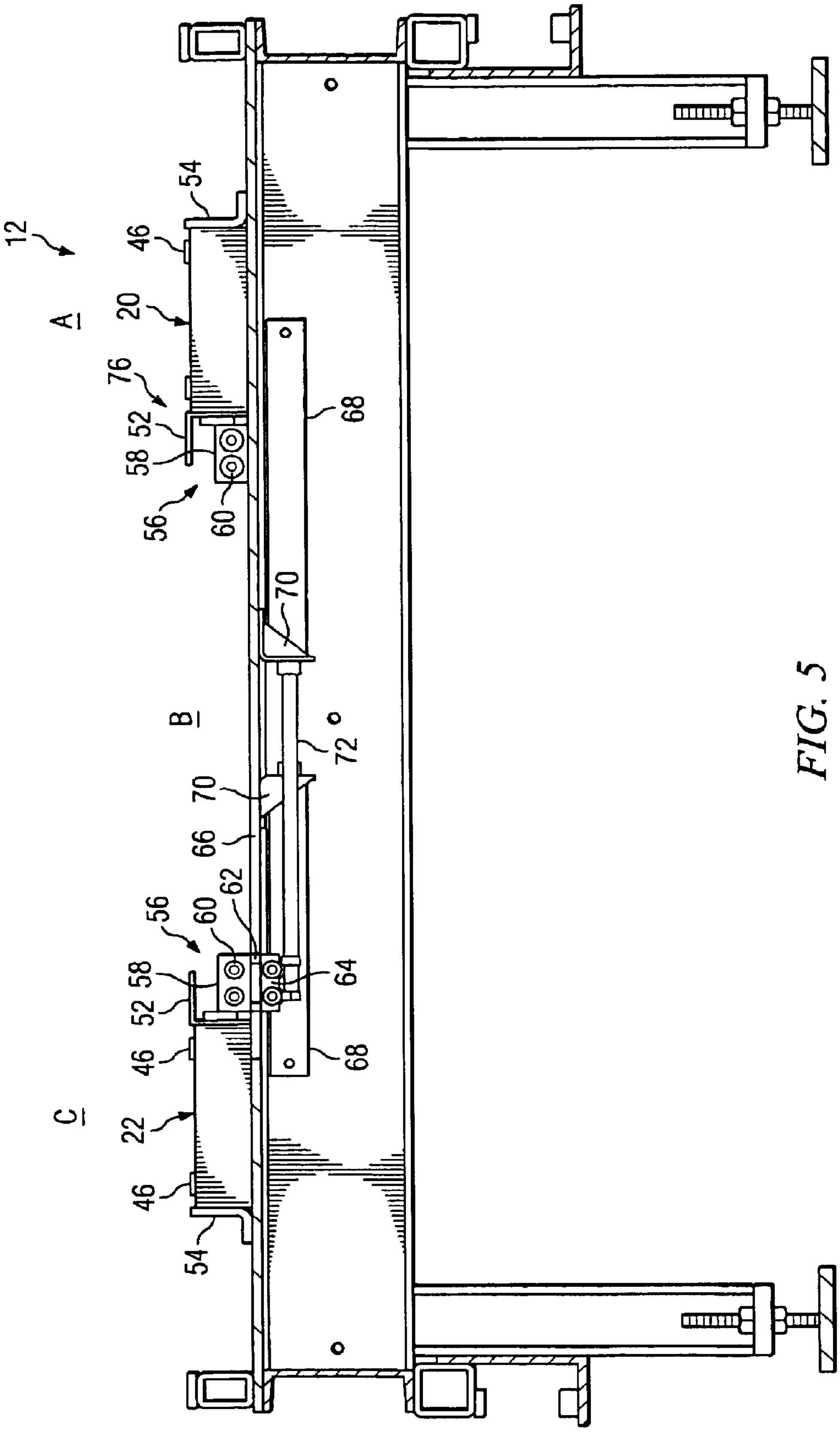
FIG. 5 is an elevational sectional view of a truss table with trusses clamped by the clamping assemblies.

Referring to FIGS. 2 and 3, truss table 12 is divided into three longitudinal zones A, B, and C by the clamping assemblies 50. In the preferred embodiment, two clamping assemblies 50 are mounted on each of the support plates 18. Assembly zones A and C on each plate 18 are coincident with the inner and outer jigs 52 and 54 of the clamping assemblies 50. Intermediate zone B extends between the clamping assemblies 50 and may be reduced to zero area when the clamping assemblies 50 are not actuated to clamp a truss 26 and 22, as seen in FIG. 2 and as will hereinafter be described. During operation of the truss assembly apparatus 10, precut truss chords 42 and webs 44 are manually placed in a first truss position 21 with a first truss face 25 contacting the table surface in zone A and are secured in place by the clamping assembly 50. Toothed connector plates 46, which may be stored in the recessed areas 48 between the outer rails 32 and the outer longitudinal jigs 52, are then placed over the joints between the truss members 42 and 44 (as seen in FIGS. 4 and 5) and subsequently embedded in place by passage of the gantry press 14 over the truss 20. The semi-finished truss 20 is then unclamped, rotated along its longitudinal axis L, and placed in zone C so that the embedded connector plates 46 are positioned downwardly. The semi-finished truss 20, now in the second truss position 23, the location of truss 22 in FIG. 2, with a second truss face 27 contacting the table surface is clamped in place by the clamping assembly 50 and secured at the joints on the now upwardly facing side of the truss 22 with connector plates 46 embedded therein by another passage of the gantry press 14. The now completed truss 22 is unclamped, removed from zone C, and moved off of the truss table 12 for storage. During typical use of the truss assembly apparatus 10, connector plates 46.are pressed into trusses 20 and 22 in both zones A and C during a single passage of the gantry press 14.

Two clamping assemblies 50 are mounted on each plate 18, as shown in FIGS. 1 and 2. The details of the clamping assemblies 50 are best illustrated in FIGS. 4 and 5. Each clamping assembly 50 includes an inner longitudinal jig 52 and an outer longitudinal camber inducing rail or jig 54 which may be divided into a plurality of longitudinally spaced jigs, as shown. The jigs 52 and 54 may be of angle irons oriented as shown. The outer jigs 54 are attached to the working surface 16 of the truss table 12. Preferably the outer jigs are bolted or otherwise removably attached, to allow reconfiguration of the jigs as desired. The inner jigs 52 are slidably mounted to the truss table 12. In the preferred embodiment, each of the inner jigs 52 are mounted to a truck assembly 56 including an upper jig truck 58 which is supplied with truck wheels 60. The upper truck 58 is connected, such as with truck spacers. 62, to a lower jig truck 64 which is similarly supplied with wheels 60. The 58 and 64 jig trucks straddle the clamping slot 66 and the wheels 60 allow the trucks 58 and 64 to roll along the upper and lower surfaces of the table plates 18, respectively. The truck spacers 62 extend through clamping slot 66 which is formed in the table plate 18 in a transverse direction across the truss table 12 as best seen in FIGS. 1 and 2. Other methods of slidable mounting, such as friction mounting, may be used without departing from the spirit of the invention. The jig trucks 58 and 64 are attached to a jig actuator, such as the air cylinder 68 shown. Other actuators may be employed, and may be mounted above or below the table surface, although the actuator design illustrated is preferred for reasons hereinafter explained. The air cylinders 68 are mounted under the surface of the table plates 18 by jig actuator brackets. The extendable air cylinder jig rods 72 are connected to the truck assemblies 58 and 64.

Turning to the clamping assembly in zone A, when the air cylinder 68 is in a retracted position, as in FIGS. 2 and 4, the inner jig 52 is positioned near the center of the truss table 12 in a home position 74 as shown. As the air cylinder 68 is actuated, the rod 72 extends outwardly, moving the truck assembly 56, which in turn moves the inner jig 52, across the truss table 12 along the clamping slot 66 toward the outer jig 54 to an extended or clamped position 76, as seen in FIG. 5. The air cylinder 68 will extend to its full length or until the inner jig 52 encounters and clamps truss into place in zone As Similarly, a truss 22 in zone C may be clamped in place by actuation of the air cylinder 68, of the clamping assembly in zone C which Will move the truck assembly 56 and inner jig 52 toward outer jig 54. The trusses 20 and 22 are unclamped after the gantry press 14 has embedded the connector plates 46 into the truss by retraction of the air-cylinder to their retracted position, seen in FIG. 4.

Referring back to FIG. 2, each inner jig 52 is preferably activated independently with a confiding air cylinder 68. The clamping assemblies 50 act in unison to hold the trusses 20 and 22 in place. Where inner jigs 52 do not encounter a truss, thy are extended as far as the air cylinder 68 will allow. One of the advantages in having a plurality of clamping. assemblies 50 each with a separate inner jig 52 acting on a single truss 20 can be seen in FIG. 6. Floor trusses, such as those seen in FIGS. 1–3, have parallel top and bottom chords 42. In low-slope roofing applications, however, the members 42 are not parallel. Sloped chord trusses can be assembled in the present truss assembly apparatus 10 because the plurality of clamping assemblies 50 will contact the sloping member 43 at more than one point on the truss, or along its entire length, as shown. A single longitudinal inner jig which ran the length off the table, such as is common, would only contact the sloped member 43 at a single location. The inner jigs 52 of the invention may be pivotally attached to the jig trucks 58, if desired, to allow for contact between the jigs and truss members with greater slopes.

Once the gantry press 14 has embedded the connector plates 46 into the trusses in zones A and C, the truss in zone C must be lifted out and removed from the table. The truss in zone A must be lifted out, turned over and placed in one C for completion of the fabrication.

Figure 6:
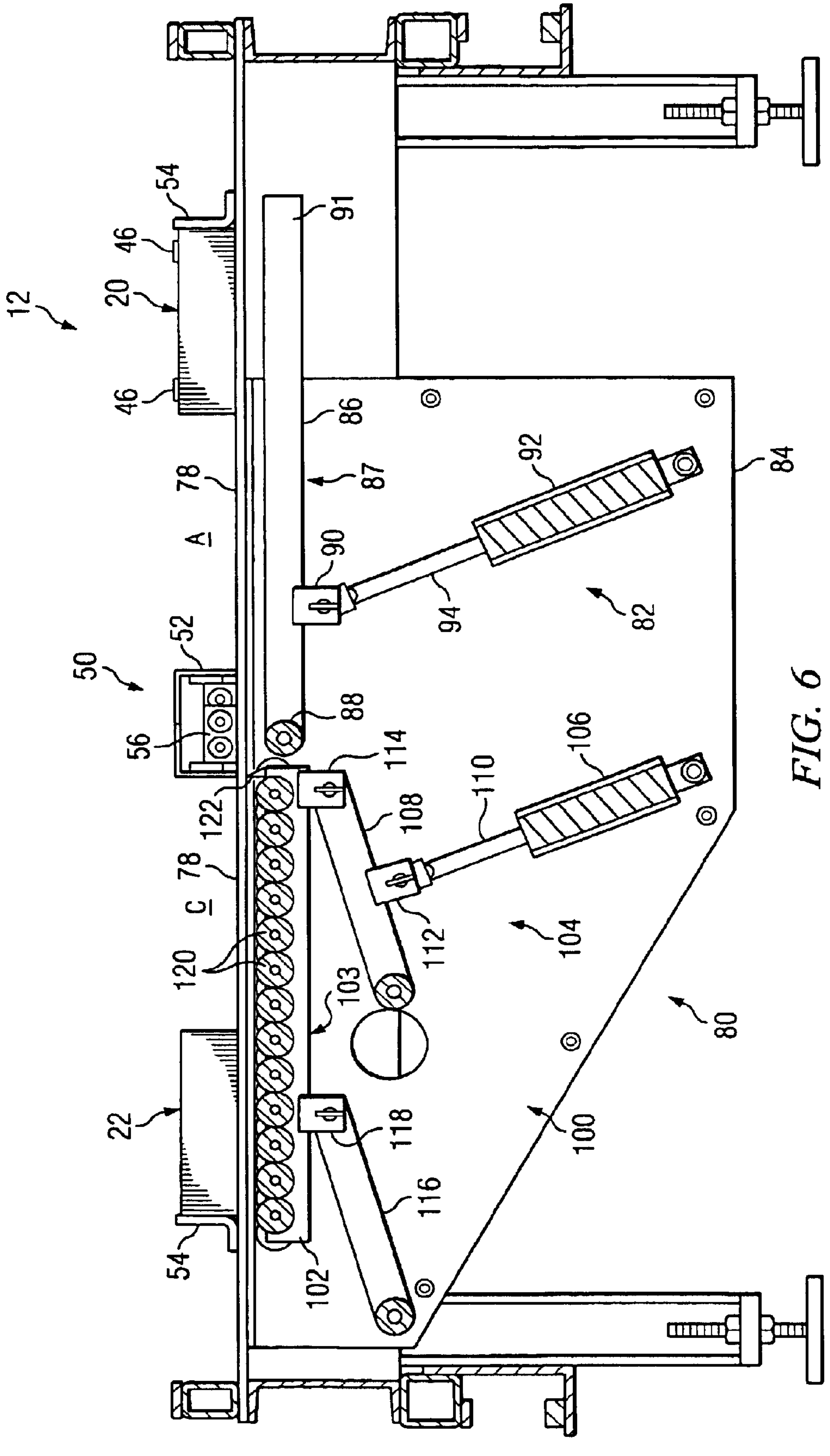
FIG. 6 is an elevational sectional view of a truss table with a truss movement assembly.
Figure 7:
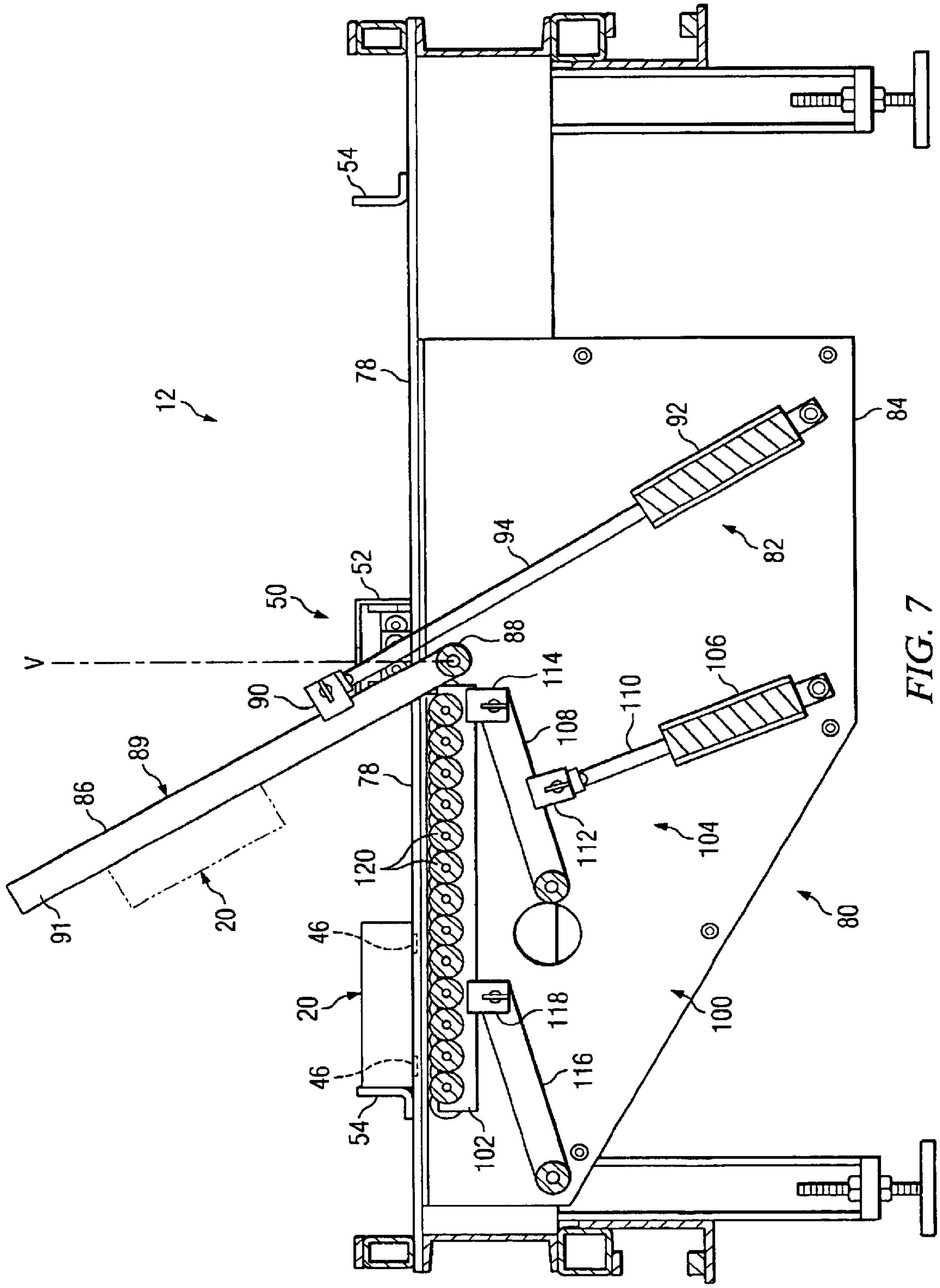
FIG. 7 is an elevational sectional view of a truss table with a truss movement assembly with the flip-over assembly actuated.
Figure 8:
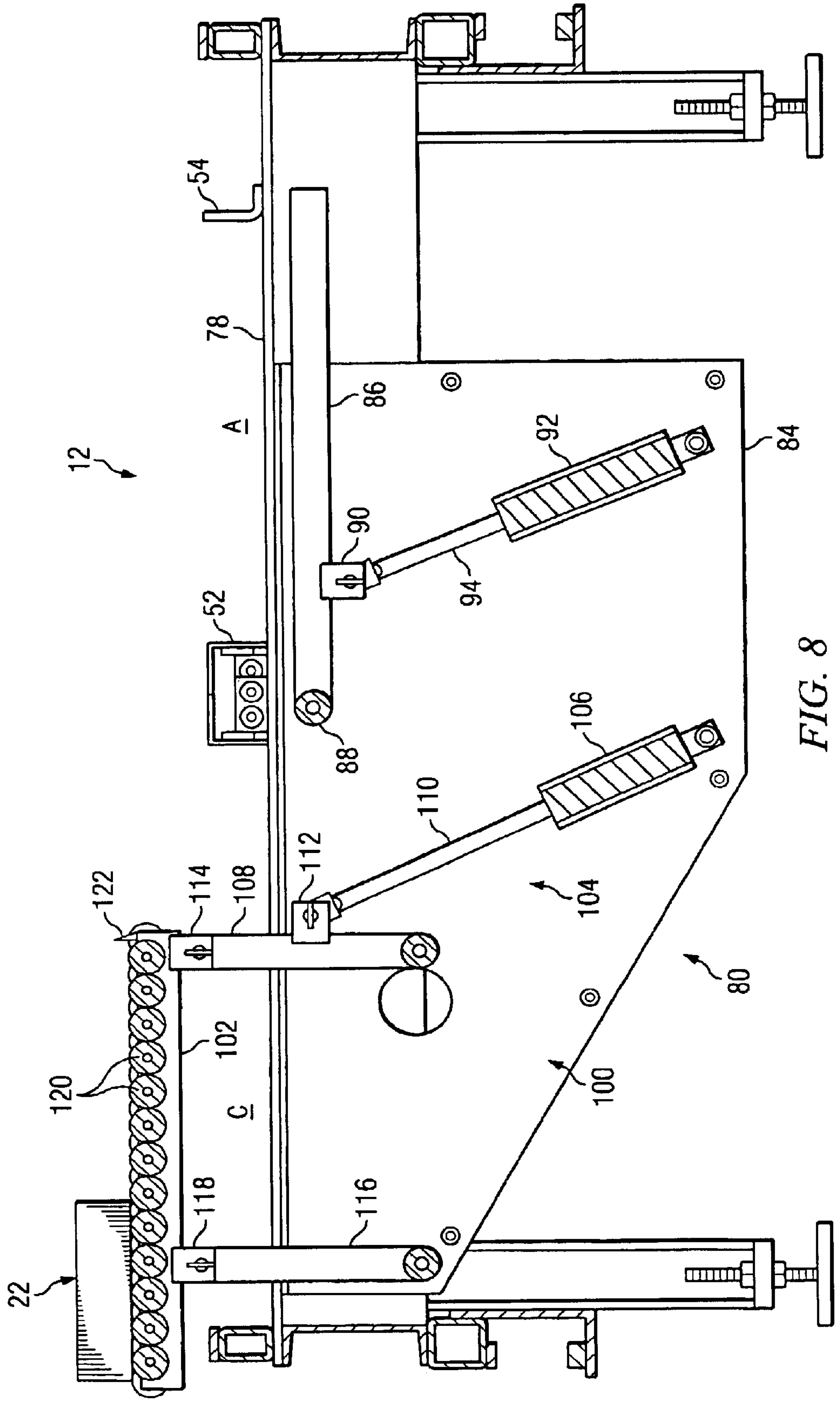
FIG. 8 is an elevational sectional view of a truss table with a truss movement assembly with the lift-out assembly actuated.

Movement of the trusses is accomplished with the truss movement assembly 80, seen in FIGS. 6–8, which comprises a flip-over assembly 82 and a lift-out assembly 100.

The flip-over assembly 82 is located adjacent zone A and is attached to the lower surface of the truss table 12 by the truss movement assembly bracket 84. The flip-over assembly 82 comprises an elongate flip-over arm 86 which is connected at one end by a flip-over arm pivot mounting 88 to the movement assembly bracket 84, adjacent the lower surface of the table 12. A flip-over arm bracket 90 pivotally connects the flip-over arm 86 at a point removed from the flip-over pivot mounting 88 to one end of the flip-over actuator 92. In the preferred embodiment, the flip-over actuator is an air cylinder 92 having one end pivotally connected to the movement assembly bracket 84 and the rod end 94 connected to the flip-over arm bracket 90.

While the truss 20 is being assembled and pressed, the flip-over assembly 82 is in a home position 87, as seen in FIG. 6, wherein the flip-over arm 86 is positioned not to interfere with assembly of the truss 20. The flip-over arm 86 is pivoted to the extended position 89, seen in FIG. 7, by the extension of the rod 94 of the air cylinder 92. The flip-over arm passes through assembly slot 78 to contact the truss 20. The flip-over arm 86 and actuator are arranged such that the flip-over arm rotates through and preferably past the vertical plane V so that the truss 20 is rotated longitudinally before falling from the flip-over arm 86 into zone C. Preferably, at least the end 91 of arm 86 moves to a position over zone C, as shown in FIG. 7. The motion and extended position 89 of the flip-over arm 86 thus lifts the truss 20 from zone A, rotates and deposits it such that the connector plates applied to the truss face downwardly in zone C.

Prior to the actuation of the flip-over arm 86, the movable inner jigs 52 are brought to their home position at the center of the table. With the inner jigs so arranged, abutting one another, the area of zone B, evident when the braces are clamping the trusses as in FIG. 5, is reduced greatly, or preferably completely, as in FIG. 6. Many truss assembly mechanisms are unable to greatly reduce or eliminate the area of zone B because of the jig mechanisms disposed in the intermediate zone. The present invention eliminates the area of zone B by mounting the clamping assembly actuators below the table surface and moving the jigs via the small jig trucks actuated through the clamping slots. Because of this feature, the flip-over arm is designed to deposit the truss directly to zone C. In prior art inventions the truss is deposited at least partially into zone B requiring manual relocation of the truss into zone C for further assembly.

The lift-out assembly 100 is positioned adjacent zone C and is attached to the truss movement assembly bracket 84 which is mounted to the table 12 below the work surface 16 as shown. The lift-out assembly 100 comprises a lift-out arm 102 and a lift-out actuator assembly 104. The lift-out arm 102 is seen in its home position 103 in FIG. 6, wherein the lift-out arm 102 does not interfere with assembly of the truss 22. After completion of assembly of the truss 22 the lift-out actuator assembly 104 is activated to raise the lift-out arm 102 and move it laterally towards the outer rail 32 at the edge of the table 12 into the extended or finished position 105 seen in FIG. 8. The lift-out arm 102 acts on the truss 22 after passing from below the table surface 16 to above the table surface through assembly slot 78. The lift-out arm 102 in turn moves the truss 22 to a position out of zone C and toward the table edge for removal to a conveyor assembly or to storage. The lift-out arm 102 is designed to raise the truss 22 above the outer rail 32. Also, the lift-out arm 102 is preferably designed such that in the extended position the lift-out arm 102 extends slightly past the outer rails 32 of the table for ease of removal of the truss from the table.

The lift-out actuator assembly 100, in the preferred embodiment, comprises a lift-out actuator, such as the air cylinder 106, pivotally connected at one end to the movement assembly bracket 84 and pivotally attached at the other end to the lift-out power arm 108. In the preferred embodiment, the actuator is an air cylinder, but other actuating devices may be employed. The rod end 110 of the air cylinder 106 is pivotally attached to the lift-out power arm 108 through the cylinder bracket 112. The lift-out power arm 108 is pivotally mounted to the movement bracket 84 at one end and pivotally attached to the lift-out arm 102 at the other end through the power arm bracket 114. Similarly, the support an 116 is pivotally connected to the movement assembly bracket 84 at one end and to the lift-out arm 102 at the other end through a support arm bracket 118. When the air cylinder 106 is actuated, the rod end 110 extends outwardly, pivoting the power arm 108 which in turn lifts and laterally moves the lift-out arm 102. The support arm 116 acts to raise and laterally move the lift-out arm in conjunction with the power arm to the extended position. Actuator assemblies other than the described system may be used without departing from the spirit of the invention.

Preferably, the lift-out arm 102 has a plurality of rollers 120 connected thereto to assist the user in moving the truss 22 off of the lift-out arm 102. The lift-out arm 102 also preferably has a stop block 122 attached to the lift-out arm 102 at its innermost end. The stop block 122 prevents the truss from rolling from the rollers 120 onto the truss table 12.

The truss assembly apparatus described herein is preferably for use in fabricating wooden trusses and joists, although other applications may be obvious to those skilled in the art.

In utilizing the truss assembly apparatus 10, precut wooden truss members 42 and 44 are arranged in zone A of the truss table 12 on the working surface 16. Simultaneously, a semi-finished truss 22 is positioned in zone C. The clamping assemblies 50 are actuated, moving the inner jigs 52 outward toward the outer jigs 54 and clamping the trusses 20 and 22 between the jigs. End stops and other devices known in the art may be added to assist in the proper arrangement of the truss members. Connector plates 46 are placed over the joints between the truss members in both zones A and C and are usually manually tapped into the wood so that they will hold their positions during pressing. The gantry press 14 moves along the length of the table embedding the connector plates 46 into the wood. The clamping assemblies 50 are returned to their original home positions 74 such that the jigs are no longer clamping the trusses. In the home positions, the clamping assemblies preferably have little or no space between them in zone B, at the center of the table. This is, in part, accomplished by positioning the jig actuators 68 below the table surface 16. The lift-out assemblies 100 are then actuated to move the lift-out arms 102 into extended positions 105, that is, to move the lift-out arms upwardly through the assembly slots 78 from below the table surface 16 and engage the truss 22 thereby raising it out of zone C and moving it toward the outer rails 32 of the table. Preferably the lift-out arm 102 include rollers 120 and move in the extended position 105 to extend over the outer rails 32 for ease of removal of the truss 22 from the truss table 12. The lift-out arm 102 may also include stop blocks 122 to prevent the truss 22 from rolling off the lift-out arms 102 the wrong direction. The lift-out arms 102 are lowered back into position under the table surface 16. The flip-over assemblies 82 are then activated. The flip-over arms 86 are rotated from a home position 74 under the table surface to an extended position 76, engaging the truss 20 and lifting it from zone A while simultaneously rotating it along its longitudinal axis L. The flip-over arms 86 deposit the truss 20 in zone C with the connector plates 46 facing downward. The flip-over arms 86 are then returned to their home positions 74. The order of the steps may vary without departing from the spirit of the invention. The process may be repeated as desired.

We claim:

1. A truss assembly apparatus for assembling a truss having a first and second truss face, said apparatus comprising:

- a truss table having a work surface, said work surface having a first and second assembly zone and a longitudinal axis;
- a first clamping assembly for clamping the truss in said first assembly zone;
- a second clamping assembly for clamping the truss in said first assembly zone;
- a flip-over assembly having a flip-over arm movable relative to said truss table work surface, the flip-over assembly capable of lifting the truss from a first truss position in said first assembly zone, the first truss face flush with said work surface, rotating the truss, and dropping the truss directly into a second truss position in said second assembly zone, the second truss face flush with the work surface; and
- a lift-out assembly having a lift-out arm movable relative to the truss table and capable of moving the truss from the second truss position upward from the work surface and away from the longitudinal axis of the truss table.

2. A truss assembly apparatus as in claim 1 wherein said flip-over arm is movable between a home position adjacent said work surface and an extended position.

3. A truss assembly apparatus as in claim 2 wherein said flip-over arm is perpendicular to said work surface when said flip-over arm is in said extended position.

4. A truss assembly apparatus as in claim 2 wherein at least a portion of said flip-over arm extends over said second assembly zone when said flip-over arm is in said extended position.

5. A truss assembly apparatus as in claim 1, said flip-over assembly having a plurality of movable flip-over arms for moving the truss from a first truss position in said first assembly zone to a second truss position in said second assembly zone.

6. A truss assembly apparatus as in claim 5, said work surface having a plurality of assembly slots therein.

7. A truss assembly apparatus as in claim 6, said plurality of flip-over arms being aligned with said plurality of assembly slots to allow movement of said flip-over arms from a plurality of home positions to a plurality of extended positions.

8. A truss assembly apparatus as in claim 7, said flip-over assembly having a plurality of flip-over actuators corresponding to said plurality of flip-over arms, each of said flip-over actuators positioned below the work surface and interconnected between said truss table and said corresponding flip-over arm, said actuators operable to move said flip-over arms.

9. A truss assembly apparatus as in claim 8, wherein each of said plurality of flip-over actuators includes an air cylinder.

10. A truss assembly apparatus as in claim 6, said first clamping assembly having a plurality of longitudinally spaced first moveable rails, spaces between said plurality of first moveable rails being aligned with said assembly slots.

11. A truss assembly apparatus as in claim 10, said second clamping assembly having a plurality of longitudinally spaced second moveable rails, spaces between said plurality of second moveable rails being aligned with said assembly slots.

12. A truss assembly apparatus as in claim 11 wherein said first movable rails are each movable between a first rail home position, wherein the truss is free to move, and a first rail clamped position, wherein said first movable rails contact the truss when the truss is in said first truss position; and

- wherein said second movable rails are each movable between a second rail home position, wherein the truss is free to move, and a second rail clamped position, wherein said second movable rails contact the truss when the truss is in said second truss position.

13. A truss assembly apparatus as in claim 12 wherein said first movable rails and said second movable rails are adjacent when said first and second movable rails are in said first and second rail home positions.

14. A truss assembly apparatus as in claim 13, said work surface having a plurality of clamping slots therein, said first and second clamping assemblies further comprising a plurality of clamping actuators positioned below the work surface and interconnected between the truss table and said first or second plurality of moveable rails, the actuators operable to move said movable rails.

15. A truss assembly apparatus as in claim 14, said clamping actuators including air cylinders.

16. A truss assembly apparatus as in claim 1 wherein said finished position is above said work surface.

17. A truss assembly apparatus as in claim 1 wherein at least a portion of said truss, when said truss is in said finished position, extends beyond said work surface.

18. A truss assembly apparatus as in claim 1 wherein said lift-out arm further comprises a plurality of lift-out arm rollers mounted thereon.

19. A truss assembly apparatus as in claim 1, said lift-out assembly having a plurality of lift-out arms.

20. A truss assembly apparatus as in claim 19, said work surface having a plurality of assembly slots therein, said plurality of lift-out arms being aligned therewith.

21. A truss assembly apparatus as in claim 20, said lift-out assembly having a plurality of lift-out actuators corresponding to said plurality of lift-out arms, each of said lift-out actuators positioned below the work surface and interconnected between said truss table and said corresponding lift-out arm, said actuators operable to move said lift-out arms.

22. A truss assembly apparatus as in claim 21 wherein each of said plurality of lift-out actuators includes an air cylinder.

23. A truss assembly apparatus for assembling a truss having a first and a second face, said apparatus comprising:

a truss table having a stationary work surface, said work surface having a first and second assembly zone and a longitudinal axis;

a first clamping assembly for clamping the truss in said first assembly zone;

a second clamping assembly for clamping the truss in said second assembly zone;

a flip-over assembly having at least one movable flip-over arm for moving the truss from a position in said first assembly zone wherein the first truss face is flush with the work surface, and dropping the truss into said second assembly zone, wherein the second truss face is flush with the work surface, and for rotating the truss along a longitudinal axis, said flip-over arms movable between a home position and an extended position and;

a lift-out assembly having at least one lift-out arm movable relative to the work surface and capable of moving the truss upwards from the second assembly zone and away from the longitudinal axis of the truss table.

24. A truss assembly apparatus as in claim 23 wherein said at least one flip-over arm is perpendicular to said work surface when said at least one flip-over arm is in said extended position.

25. A truss assembly apparatus as in claim 23 wherein at least a portion of said at least one flip-over arm extends over said second assembly zone when said flip-over arm is in said extended position.

26. A truss assembly apparatus as in claim 23 wherein at least a portion of said truss, when said truss is in said finished position, extends beyond said work surface when the lift-out assembly moves the truss upward from the second assembly zone and away from the longitudinal axis.

27. A truss assembly apparatus as in claim 23 wherein said at least one lift-out arm further comprises a plurality of lift-out arm rollers mounted thereon.

28. A truss assembly apparatus as in claim 23, said work surface having at least one assembly slot therein.

29. A truss assembly apparatus as in claim 28, said at least one flip-over arm being aligned with said at least one assembly slot to allow movement of said at least one flip-over arm from between said home position and said extended position.

30. A truss assembly apparatus as in claim 29, said flip-over assembly having at least one flip-over actuator corresponding to said at least one flip-over arm, said at least one flip-over actuator positioned below the work surface and interconnected between said truss table and said at least one flip-over arm, said actuator operable to move said flip-over arm.

31. A truss assembly apparatus as in claim 23 said lift-out assembly having at least one lift-out actuator corresponding to said at least one lift-out arm, said at least one lift-out actuator positioned below the work surface and interconnected between said truss table and said at least one lift-out arm, said actuator operable to move said at least one lift-out arm.

32. A truss assembly apparatus as in claim 23 said first clamping assembly having a plurality of longitudinally spaced first moveable rails, spaces between said plurality of first moveable rails being aligned with a plurality of assembly slots in said work surface.

33. A truss assembly apparatus as in claim 32, said second clamping assembly having a plurality of longitudinally spaced second moveable rails, spaces between said plurality of second moveable rails being aligned with said plurality of assembly slots.

34. A truss assembly apparatus as in claim 33 wherein said first movable rails are each movable between a first rail home position, wherein the truss is free to move, and a first rail clamped position, wherein said first movable rails contact the truss when the truss is in said first assembly zone; and wherein said second movable rails are each movable between a second rail home position, wherein the truss is free to move, and a second rail clamped position, wherein said second movable rails contact the truss when the truss is in said second assembly zone.

35. A truss assembly apparatus as in claim 34 wherein said first movable rails and said second movable rails are adjacent when said first and second movable rails are in said first and second rail home positions.

36. A truss assembly apparatus for assembling a truss having a first and second truss face, said apparatus comprising:

a truss table having a, work surface, said work surface having a first and second assembly zone and a plurality of assembly slots therein;

a first claiming assembly for clamping the truss in said first assembly zone,the first claiming assembly having a plurality of longitudinally spaced first movable rails, the spaces between the rails aligned with the assembly slots and wherein said first movable rails are each movable between a first rail home position, wherein the truss is free to move, and a first rail clamped position, wherein said first movable rails contact the truss when the truss is in said first truss position, the first clamping assembly having a plurality of clamping actuators positioned below the work surface and capable of moving the first movable rails and;

the second clamping assembly having a plurality of longitudinally spaced second movable rails, the space between the rails aligned with the assembly slots and wherein said second movable rails are each movable between a second rail home position, wherein the truss is free to move, and a second rail clamped position, wherein said second movable rails contact the truss when the truss is in said second truss position, and wherein said first movable rails and said second movable rails are adjacent when said first and second movable rails are in said first and second rails home positions, the second clamping assembly having a plurality of clamping actuators positioned below the work surface and capable of moving the second movable rail;

a flip-over assembly having a plurality of flip-over arms movable relative to said truss table work surface the flip-over arms capable of lifting the truss from a first truss position in said first assembly zone, the first truss face flush with said work surface, rotating the truss, and dropping the truss directly into said second assembly zone, the second truss face flush with the work surface.

37. A truss assembly apparatus as in claim 36, said clamping actuators including air cylinders.

38. A truss assembly apparatus as in claim 36 the truss table having a longitudinal axis, and further comprising a lift-out assembly having at least one lift-out arm movable relative to the truss table for moving the truss above the work surface and away from the longitudinal axis.

39. A truss assembly apparatus as in claim 38, wherein at least a portion of said truss, when said truss is in said finished position, extends beyond said work surface.

40. A truss assembly apparatus as in claim 36, wherein said at least one lift-out arm further comprises a plurality of lift-out arm rollers mounted thereon.

* * * * *